UNITED STATES PATENT OFFICE.

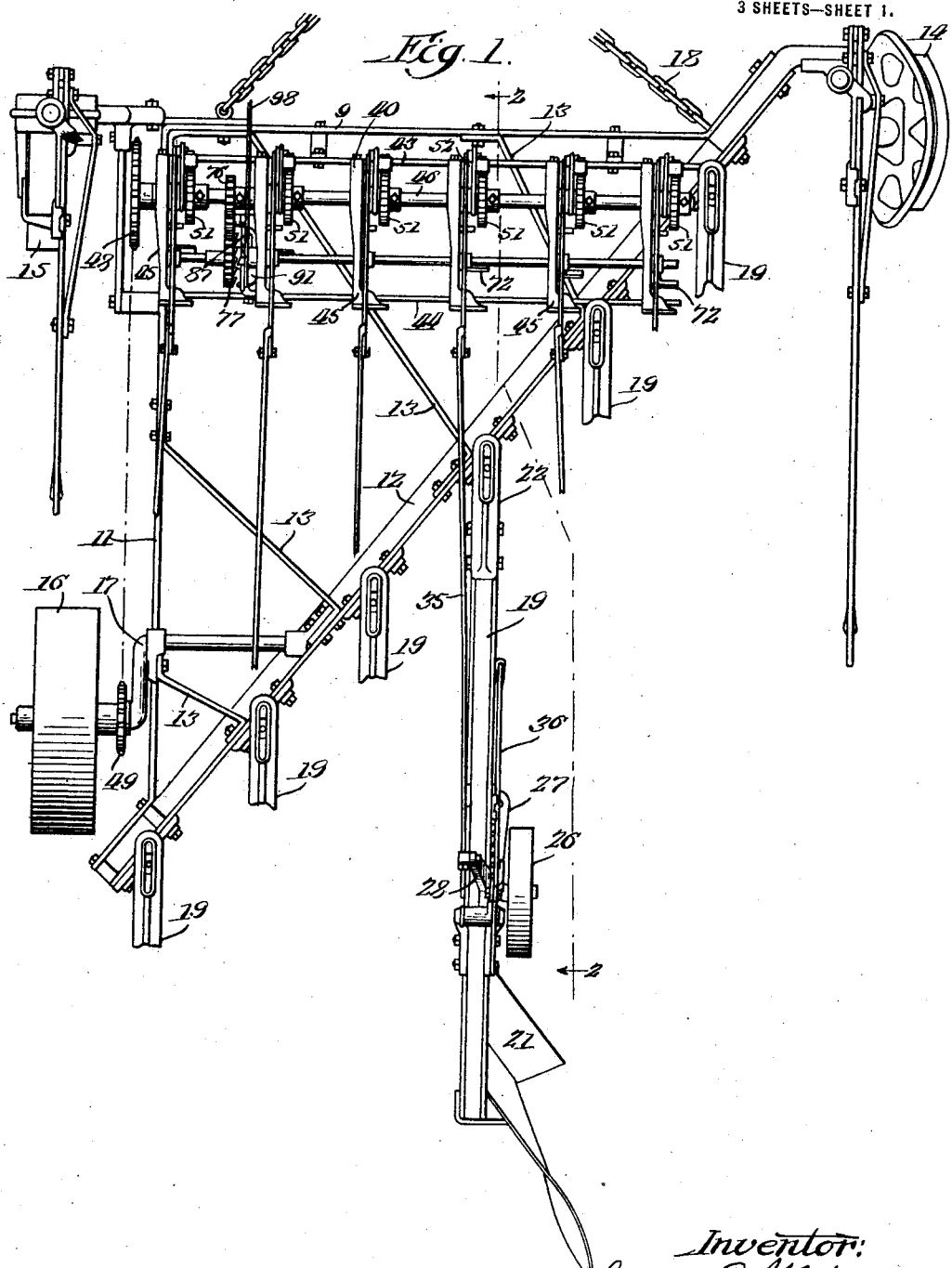

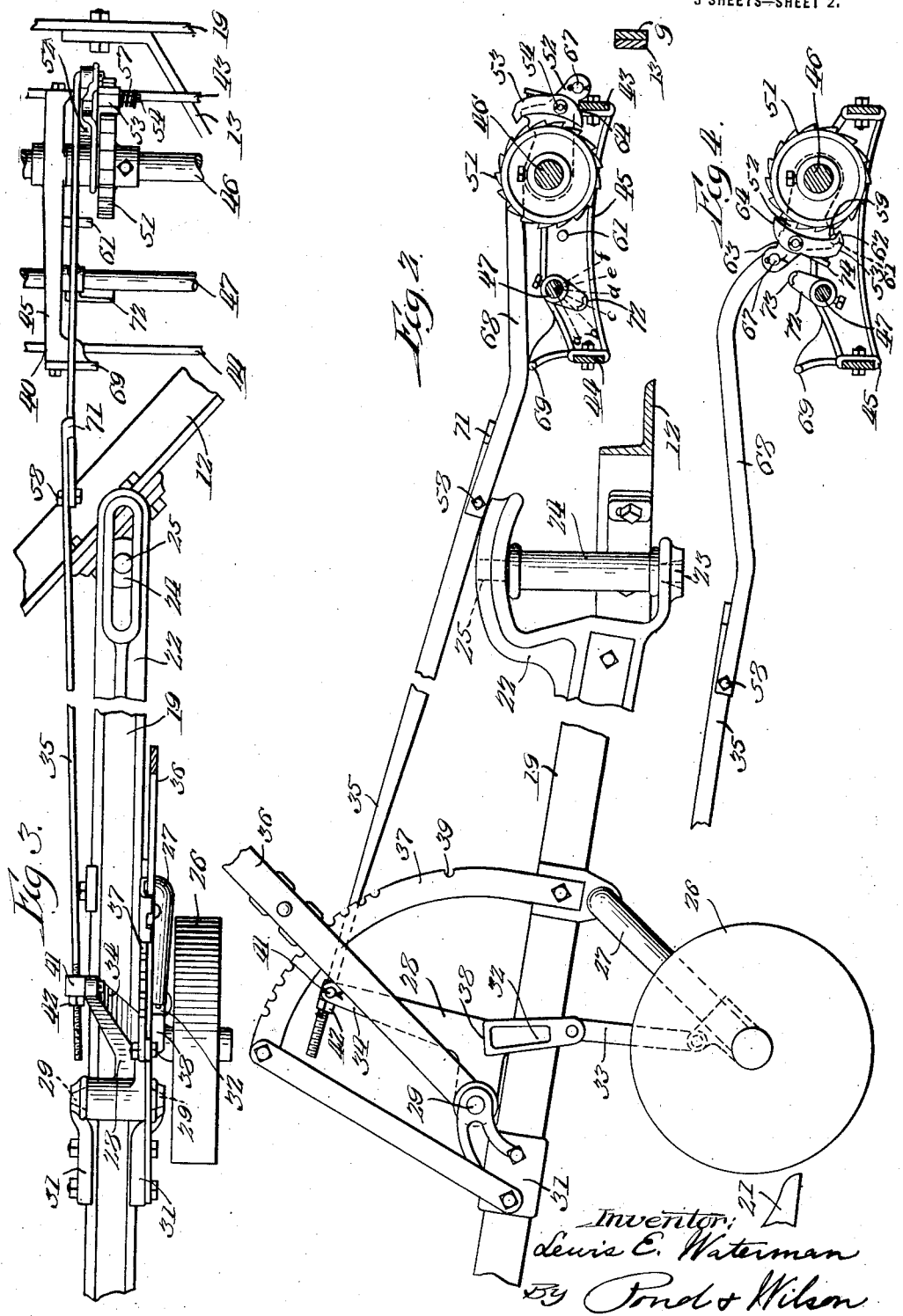

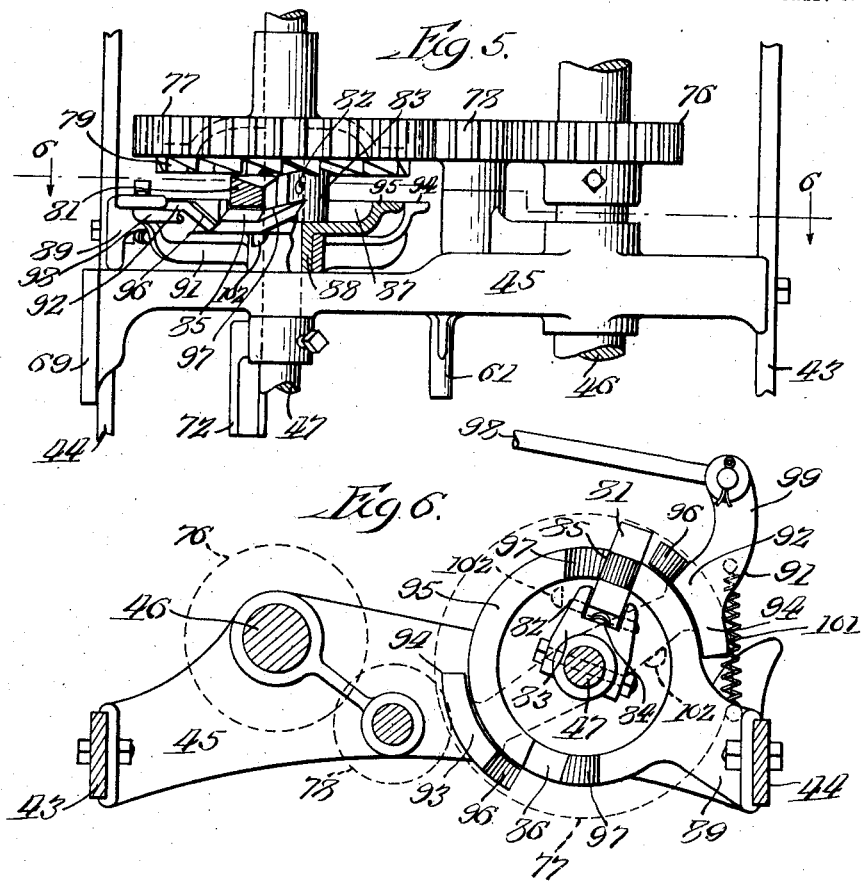
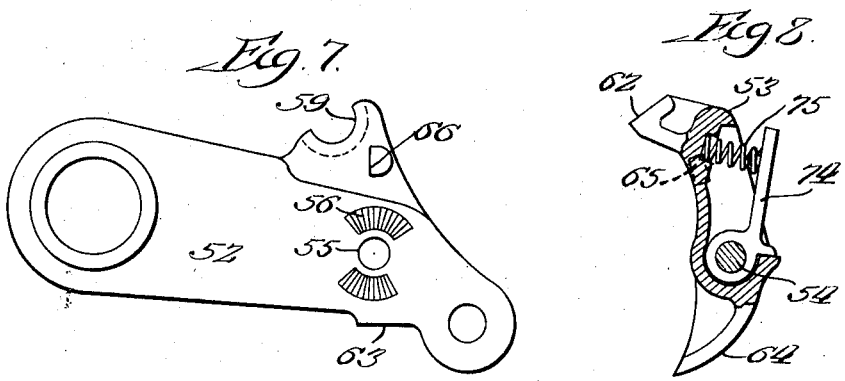

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

POWER-LIFT PLOW.

1,384,792. Specification of Letters Patent. Patented July 19, 1921.

Application filed December 16, 1915. Serial No. 67,201.

*To all whom it may concern:*

Be it known that I, LEWIS E. WATERMAN, a citizen of the United States, residing at Rockford, in the county of Winnebago and State of Illinois, have invented certain new and useful Improvements in Power-Lift Plows, of which the following is a specification.

This invention relates in general to improvements in plows and to power lifts therefor, and has more particular reference to gang plows employing power-operated means for raising and lowering the plows.

One of the primary objects of my invention is to provide a power lift gang plow which may be easily operated to automatically raise and lower the plows in succession, and which is improved and simplified in construction so as to be thoroughly practicable and durable and capable of production at a comparatively low cost.

My invention also contemplates the provision in a gang plow of an improved mechanism for raising and lowering the plows in succession and wherein a single mechanism is employed for effecting both raising and lowering of the plows in predetermined timed relation. More particularly, I have provided a lifting device for each plow adapted to be connected to and operated by a power-operated mechanism for lifting the plows and means under the control of the operator adapted to automatically connect said lifting devices in succession to the power-operated mechanism and to automatically actuate said devices to lower the plows in succession.

Another object is to provide a power lift mechanism which will be simple and easy to operate and will require no attention from the operator after having been once actuated to either raise or lower the plows. With this end in view, I have provided a single control member adapted when actuated to put into operation a mechanism which automatically effects raising of the plows by power in timed succession and upon being actuated a second time causes the plows to be lowered in like succession.

Other objects and attendant advantages will be apparent as the invention becomes better understood by reference to the following description when considered in connection with the accompanying drawings, wherein—

Figure 1 is a plan view of a gang plow embodying my improvements, only one of the plows being fully shown;

Fig. 2 is a longitudinal sectional view through the gang plow taken on the line 2—2 of Fig. 1, showing the plow in raised position;

Fig. 3 is a plan view of the plow and lifting mechanism shown in Fig. 2;

Fig. 4 is a view of the lifting mechanism shown in Fig. 2, but with the parts in the position assumed when the plow is in the ground;

Fig. 5 is an enlarged view, partly in section, of the driving connections between the continuously operated driving shaft and the driven shaft;

Fig. 6 is a cross sectional view taken on the line 6—6 of Fig. 5;

Fig. 7 is an enlarged detail view of the pawl carrying arm of the lifting mechanism; and Fig. 8 is a detail view, partially in section, of the pawl employed in the raising mechanism.

Referring to Fig. 1, it will be observed that I have embodied my improvements in a gang plow comprising six plows, the number of plows, however, being arbitrary, as any suitable number may be employed. The gang plow comprises, in general, a wheel-supported draft frame upon which is mounted a power-operated mechanism and to which is connected a plurality of plow beams adapted to be raised and lowered by the power-operated mechanism. The supporting frame consists, in the present instance, of front, land side, and rear bars 9, 11 and 12 respectively, arranged in triangular formation with the rear bar disposed diagonally to the line of draft and suitably connected together at their ends and braced by bars 13. This frame is supported by a front furrow wheel 14 and front and rear land wheels 15 and 16 respectively, each connected to the frame so as to be adjustable vertically relatively thereto. The rear land wheel 16 is mounted on a cranked member 17, journaled in bearings secured to the frame and the means for holding said crank member 17 against rotation and whereby the said wheel is vertically adjusted, is not shown in the drawings. Suitable draft means 18 is provided for hitching the draft frame to a tractor.

A plurality of plow beams 19 equipped at their rear ends with moldboard plows 21 are so pivotally connected at their forward ends in spaced relation to the diagonally disposed bar 12 of the draft frame that they may swing vertically and horizontally upon their pivoted front ends. Since the construction and operation of each plow beam is similar, a description of one will suffice. Referring, therefore, to Figs. 2 and 3, it will be noted that the pivotal mounting of the plow beam shown therein is obtained by securing to the front end of the beam a yoked bracket 22, the lower arm of which is formed with an aperture to receive a pin 23 depending from the upright post 24 which is secured to the rear frame bar 12 and the upper arm arcuately shaped and slotted to receive a pin 25 extending upwardly from the post 24 in vertical alinement with the pin 23. This construction permits the beam 19 to swing horizontally on the longitudinal axis of the post and to swing vertically upon the pin 23 as a fulcrum. The plow beam is equipped with a gage wheel 26 journaled on a cranked member 27, which is pivotally mounted on the beam and adapted to be swung on its pivot to move the beam vertically and carry the plow into and out of the ground. The means for so moving the cranked member consists of a bell crank designated in general by reference character 28, formed with opposed, tapered trunnions 29 fitting in bearings on the brackets 31 which are bolted to the beam, whereby the crank is pivotally mounted. One arm 32 of the bell crank extends downwardly to one side of the beam and is fixedly connected by means of a link 33 to a bracket secured to the outer end of the cranked member 27. The other arm 34 of the bell crank extends upwardly and is connected by means of a rod 35 to a power-operated raising and lowering mechanism mounted on the draft frame, said mechanism being described in detail hereinafter. A hand lever 36 loosely mounted on the bell crank lever 28 concentric with the pivot axis thereof is provided with a spring-pressed latch coöperating with a notched sector 37 fixedly secured to the plow beam and lies in the path of the inner end or face 38 of the arm 32 so that said face is adapted to abut against the lever. As shown in Fig. 2, the bell crank lever 28 is held by the power-operated mechanism so as to maintain the beam raised and the plow out of the ground, and the hand lever is set some distance from the face 38 of said bell crank. From the above, it will be apparent that upon swinging the arm 34 of the bell crank backwardly the plow will be lowered into the ground to a depth determined by the face 38 abutting against the lever 36 which serves as an adjustable stop for limiting the depth of plowing. When the plow is in the ground it may be raised by hand by swinging the lever 36 forwardly until its spring pressed latch engages in the notch 39 on the sector 37, it being apparent that such operation will be effected without disturbing the power-operated lifting mechanism by reason of the rod 35 being connected to the arm 34 by means of a one-way connection which allows the said arm 34 to move forwardly relatively to the rod 35. This connection is obtained by passing the rod 35 through an aperture in a block 41 swiveled to the arm 34 and providing a nut or stop 42 threaded onto the said rod 35 at the rear of the swiveled block 41.

The power-operated mechanism for raising and lowering the plows in succession will now be described. Referring to Fig. 1, a supplemental frame designated in general by reference character 40, is mounted upon and secured to the draft frame extending transversely across the front end thereof. The frame 40 consists of two parallel bars 43 and 44 extending transversely across the front end of the draft frame and resting upon and secured to the bars 11 and 12 thereof and secured also to the front bar 9 and a plurality of cross or tie bars in the form of brackets interposed between and bolted to the bars 43 and 44 and designated in general by reference character 45. These brackets have journaled therein two shafts 46 and 47 which may be characterized as driving and driven shafts respectively. The driving shaft 46, disposed forwardly of the driven shaft has fixedly secured thereto at the outer side of the most landward bracket 45 a sprocket wheel 48, which is in alinement with a second sprocket wheel 49 connected with the rear land wheel 16. These sprocket wheels are connected with an endless chain (not shown) so that as the plow is drawn along the ground during operation, the shaft 46 will be continuously driven. Thus the shaft 46 may be termed a continuously driven power shaft, the power being derived from traction of the rear land wheel.

Mounted upon the power shaft 46 is an independent mechanism for lifting each plow. These lifting mechanisms being similar in construction and operation, I will describe in detail but the one connected with the plow beam described in detail above, viz., the third beam from the furrow side of the plow. Referring now to Figs. 2, 3, 4, 7 and 8, a ratchet wheel 51 is fixedly mounted on the shaft 46 and an arm generally designated by 52 loosely mounted on said shaft intermediate the said ratchet wheel and the adjacent bracket 45 carries a pawl 53 adapted to engage in the teeth of the ratchet wheel. The pawl pivotally mounted on a pivot bolt 54 fixedly secured in the aperture 55 (Fig. 7) in the arm 52 is constantly urged against a serrated face 56 on said arm by an expansion spring 57 (Fig. 3) mounted on the pivot pin 54 between an end washer thereon and the pawl so as to hold the pawl against accidentally turning on its pivot pin. The arm 52 pivotally connected at its outer end with the arm 34 of the bell crank 28 by means of a rod 35, mentioned above, which is jointed intermediate its ends at 58, is adapted to be swung on the shaft 46 in a counterclockwise direction, viewing Fig. 2, to lower the plow, and to be moved in the reverse direction by the ratchet wheel 51 through engagement of the pawl 53 therewith to raise the plow. Referring to Fig. 4 in which the several parts are shown with the plow in lowered working position, it will be noted that the arm 52 is provided with a recessed foot 59 which rests on a lug or stop 61 integral with the bracket 45 and that the pawl 53 is adapted to be swung on its pivot in a counterclockwise direction to engage its pointed end 62 with the toothed face of the ratchet wheel. Power-operated means described hereinafter is provided for moving the pawl into engagement with the ratchet wheel. Since the ratchet wheel is being constantly driven in a clockwise direction, viewing Fig. 4, the pawl upon being engaged with the ratchet wheel will be moved therewith and consequently swing the arm 52 forwardly, which will raise the plow. When raising the plow the arm 52 will be swung to a position limited by engagement of the face 63 of said arm with the top of the frame bar 43, as shown in Fig. 2, and just prior to this point in the movement of the arm 52, the pawl 53 will be thrown out of engagement with the ratchet wheel 51 by engagement of the curved cam face 64 of the pawl with the bar 43. In order to prevent the cam end of the pawl from striking the ratchet wheel when in this position, the pawl is provided with a laterally projecting lug 65, shown dotted in Fig. 8, which engages a stop 66 (Fig. 7) integral with the arm 52 and prevents the pawl from turning in a counterclockwise direction. The plow lifting device upon being connected with the power shaft and moved thereby to the position shown in Fig. 2, wherein the plow is raised, is automatically locked in such position by reason of the center of the pivot 67 of the outer end of the arm 52 being carried below a line passing through the centers of the shaft 46 and the swivel block 41 and the weight of the plow being carried through the rod 35 so as to exert a constant backward pull on said rod, which holds the arm 52 in its locked position. It will be noted that the forward section of the jointed rod 35 is turned downwardly at its forward end and shaped to provide a straight portion 68 which rests upon an upstanding abutment 69 formed integral with the bracket 45 and that the rear section of said rod 35 is provided with an end extending forwardly from the pivot 58 and turned laterally to form a stop 71 which holds the sections substantially in alinement and against pivoting downwardly. The purpose of forming the rod 35 in two sections is to permit uniform construction of the forward sections of all the rods 35 and to obtain uniform positioning of the portion 68 of said forward sections relatively to an actuating device described later, it being apparent that since the rods 35 are disposed at varying angles due to their varying lengths the provision of the joint 58 is necessary to allow play between the sections of certain of said rods in order that their front sections will rest properly on the abutments 69 and may be of uniform shape, as before mentioned. From the foregoing, it will be apparent that each plow is attached to a lifting device which is adapted to be connected to a constantly rotating shaft and operated thereby to lift its plow and that the lifting device is automatically disconnected from the power-operated shaft and automatically locked in position to hold the plow in raised position. It will also be manifest that due to the weight of the plow being carried through the rod 35 in a pulling strain in a backward direction, upon raising the forward section 68 of the rod 35 until its pivoted end 67 passes the line connection the centers of the shaft 46 and swivel block 41, the plow will drop into the ground by its own weight to a depth limited by the hand lever 36.

I have provided power-operated means put into operation by a hand control for throwing in succession, the pawls of the several lifting mechanisms into engagement with their respective ratchet wheels, which means is also employed for actuating the lifting mechanism and effecting lowering of the plows in succession. This means consists of the driven shaft 47, mentioned above, on which is rigidly mounted a plurality of tappet arms 72, one for each lifting mechanism, provided with laterally extending ends 73 adapted to engage the pawls 53 and portions 68 of the rods 35, as will presently appear. Referring to Fig. 4, it will be noted that when the plow controlled by this mechanism is in working position the shaft 47 when turned in a clockwise direction will move its arm 72 into connection with the pawl 54 and swing the same into engagement with the ratchet wheel 51. The pawl 54 is provided with a yielding abutment against which the end 73 of the arm 72 engages when throwing the pawl into engagement with the ratchet wheel. This yielding abutment, best shown in Fig. 8, is in the form of an arm 74 pivotally mounted on the pivot pin 54 and an expansion spring 75 interposed between the arm 74 and the pawl, which allows the arm or abutment 74 to yield when engaged by the tappet arm 72. This yielding abutment prevents breakage which might be occasioned by engagement of the positively driven arm 72 with a rigid pawl for the reason that the pawl frequently is forced against a high portion of a tooth on the clutch wheel and is unable to immediately enter between the teeth under pressure exerted by the arm. When the lifting mechanism has been put into operation by the tappet arm 72 and has raised the plow to the position shown in Fig. 2, continued rotation of the shaft 47 in a clockwise direction would cause its tappet arm 72 to engage the underside of the section 68 and raise said section so as to lower the plow. It will be noted that during this raising of the section 68 both sections of the rod 35 will be held in alinement by the weight of the plow so that when the tappet arm 72 engages the section 68, the same will not swing about its pivoted end 41 as a fulcrum. The several tappet arms 72 of the lifting mechanisms are arranged on the shaft in equally spaced angular relation through an arc of substantially 90 degrees as indicated by dotted lines $a$, $b$, $c$, $d$, $e$, and $f$ in Fig. 2, which represent respectively, the positions of the arms for actuating the lifting mechanisms commencing with that at the land side of the plow. By rotating the shaft 47 clockwise a half revolution from the position shown in Fig. 2, the tappet arms 72 represented by the dotted lines $a$, $b$, $c$, $d$, $e$, and $f$ will engage the sections 68 in succession and lower the plows in succession commencing with the most furrowward plow. When the shaft 47 has thus been rotated a half revolution, the tappet arm 72 represented by the dotted line $a$ will be positioned in close proximity to its respective pawl 53 and upon again rotating said second shaft a half revolution, the tappet arms 72 will successively throw their respective pawls into engagement with the clutch wheels and cause the plows to be raised in succession in the same order that they are lowered. Thus it will be apparent that a single actuating mechanism, viz., the tappet arms 72, is employed for connecting the plow lifting device with the power driven shaft to raise the plows in succession and for releasing the said lifting mechanisms from their locked positions so as to lower the plows in succession.

In order that the actuating mechanism may be automatically operated to raise and lower the plows in a positive and predetermined timed relation, I have provided power-operated means adapted to be actuated and controlled by the operator for operating this mechanism. This power-operated means, driven from the power shaft 46, comprises a clutch device whereby the shaft 47 may be rotated intermittently in half revolution movements during each of which the plows will be either raised or lowered in succession as the case may be. This mechanism, best shown in Figs. 5 and 6, comprises a spur gear 76 fixed to the shaft 46 and a driving spur gear 77 loose on the shaft 47 adapted to be driven through the intermediary of a reversing spur gear 78 mounted on the bracket 45 and a clutch mechanism of which the gear 77 constitutes the driving member. The gear 77 is adapted to be connected to the shaft 47 by means of a dog engaging in the toothed face 79 of said gear, which dog is pivotally mounted at 82 on a collar 83 fixedly secured to the shaft 47. The dog normally held out of the path of the teeth 79 by an expansion spring 84 carried in the collar 83 is adapted to be held by said spring in either of the diametrically opposite depressions 85 or 86 disposed in the face of a disk 87. This disk is provided with a hub 88 loosely journaled on the shaft 47 and a portion 89 bolted to the bar 44 so as to hold the disk stationary. A rocking member 91 is adapted to be operated for moving the dog into engagement with the driving member of the clutch and thereby establish a driving connection between the shaft 46 and 47. This member 91 loosely journaled on the hub 88 is provided with a pair of oppositely extending arms provided at their outer ends with actuating heads 92 and 93. These heads are formed with flat faces 94 disposed in the plane of the face 95 of the disk 87 and inclined faces 96 adapted when the member 91 is rocked in a counter-clockwise direction viewing Fig. 6, to engage the dog 81 and move it along the inclined face 97 of the disk member into engagement with the toothed face 79. The actuating member 91 is moved by an operator pulling a rod 98 connected to the arm 99 of the said member, and a contractile spring 101 connecting the arm 99 and portion 89 of the disk member 87 restores the actuating member 91 to inoperative position. The rocking movement of the dog actuating member 91 is limited by stops 102 integral with the back face of the disk member 87. From the foregoing, it will be apparent that when the operator pulls the rod 98 forwardly the dog 81 will be engaged with the driving member 97 of the clutch and establish a positive driving connection between the shafts 46 and 47. The clutch will remain engaged until the shaft 47 has been rotated a half revolution whereupon the dog will automatically drop into the recesses 86, stopping rotation of the shaft 47. During such rotation of the shaft 47, the tappet arms 72 have successively lowered the plows as described above. Upon again pulling the rod 98 forwardly, the shaft 47 will be rotated a half revolution and the plows will be automatically raised in succession. It will be here noted that because of the positive driving connection between the power shaft 46 and the shaft 47 the tappet arms 72 will be positively moved so as to put into operation the power lifting devices in succession in predetermined timed relation in accordance with the travel of the plow along the ground. In other words, my improved construction insures that the plows may all be either raised or lowered automatically by power-operated means at the will of the operator during the travel of the plow a given distance so that the plows will enter the ground on a line substantially at right angles to the line of draft and leave the ground in a similar manner. It should be observed that to raise or lower the plows, it is merely necessary to pull the rod 98 forwardly and then release it, since the plow raising and lowering mechanism is so designed that upon this single operation at the will of an operator the raising and lowering operations will be automatically carried on and terminated at the proper time. Thus an operator seated on a tractor, which draws the plow, may easily control the plows without taking his attention from the control of the tractor when it is necessary to take particular care in guiding and controlling the same.

I claim:

1. In a power lift plow, the combination of a plow, a ratchet wheel, a plow lifting rod, a pivoted arm connected to the forward end of said lifting rod and equipped with a pawl adapted to engage said ratchet wheel and thereby lift the plow by movement of said lifting rod beyond a dead-center position, and a revolving tappet arranged to move the pawl into engagement with the ratchet wheel and to subsequently actuate the lift rod for releasing the same from said position whereby the plow is free to lower.

2. A power lift plow, the combination of a continuously operating power shaft, a driven shaft, means including an automatically releasable clutch for connecting said shafts, manually operable means for engaging the clutch, a plurality of independently liftable plows, a lift rod for each plow, a ratchet wheel for each plow fixed to the power shaft, a pawl carried by each rod, and tappets on the driven shaft each having a single bearing surface for moving a pawl into engagement with its respective ratchet wheel upon one actuation of said clutch to lift a plow and for operating its respective rod upon the next actuation of the clutch to lower said plow.

3. In a power lift plow, the combination of a continuously rotating ratchet wheel, a plow, a lift rod connected to said plow, a pawl carried by said lift rod, and a tappet having a single actuating portion and so arranged with respect to said pawl and the lift rod as to move the pawl into engagement with its ratchet wheel to lift the plow and subsequently to actuate the lift rod and release it from its plow-lifting position, causing the plow to be lowered.

4. In a power lift plow, the combination of a plurality of independently liftable plows, a continuously operating power shaft, a lift rod for each plow equipped with a pawl adapted to engage a ratchet wheel, a driven shaft, means including an automatically releasable clutch for connecting said shafts, and a plurality of tappets fixed to the driven shaft, each tappet shaped to provide a single actuating portion adapted upon one operation of the driven shaft, to move its respective pawl into engagement with its ratchet wheel for lifting a plow and adapted upon subsequent operation of the driven shaft, to operate the lift rod of said plow for lowering the latter.

5. In a power lift plow, the combination of a continuously operating power shaft equipped with a plurality of fixed ratchet wheels, a plurality of independently liftable plows, lifting connections for the plows including pawls adapted to engage said ratchet wheels and be carried thereby beyond a dead-center position in which the plows are held raised, and a driven shaft equipped with a tappet for each lifting connection, each tappet having a single actuating portion for operating its pawl and lifting connection for causing its respective plow to be raised and lowered.

LEWIS E. WATERMAN.